United States Patent

Zebrowski

[11] Patent Number: 5,836,469
[45] Date of Patent: Nov. 17, 1998

[54] BOTTLE WITH GRIPPING SUPPORT

[76] Inventor: Stanton Zebrowski, 61-73 Seaview Ave., Stamford, Conn. 06902

[21] Appl. No.: 599,490

[22] Filed: Jan. 24, 1996

[51] Int. Cl.[6] .............................. B65D 1/40; B65D 23/10
[52] U.S. Cl. ........................ 215/384; 215/396; 215/398; 220/771
[58] Field of Search .................................. 215/384, 385, 215/396, 398; 220/771

[56] References Cited

U.S. PATENT DOCUMENTS

| | | | |
|---|---|---|---|
| 3,140,329 | 7/1964 | Nutting | 215/398 X |
| 3,232,495 | 2/1966 | Schneider | 215/384 X |
| 3,434,635 | 3/1969 | Mason, Jr. | 215/390 X |
| 4,193,699 | 3/1980 | Haygeman et al. | 215/398 X |
| 4,280,859 | 7/1981 | Thompson | 215/398 X |
| 4,368,827 | 1/1983 | Thompson | 215/398 |
| 4,372,455 | 2/1983 | Cochran | 215/385 |
| 4,456,134 | 6/1984 | Cooper | 215/396 X |
| 4,552,396 | 11/1985 | Rais | 215/396 X |
| 4,629,598 | 12/1986 | Thompson | 215/398 X |
| 4,805,808 | 2/1989 | Larson | 215/398 X |
| 4,915,241 | 4/1990 | Mortmura et al. | 215/398 |
| 4,964,522 | 10/1990 | Umetsu et al. | 215/398 |
| 5,467,915 | 11/1995 | Mattson | 215/396 X |
| 5,469,612 | 11/1995 | Collette et al. | 215/396 X |

*Primary Examiner*—Sue A. Weaver
*Attorney, Agent, or Firm*—Patrick J. Walsh

[57] ABSTRACT

A thin-walled plastic beverage container is provided with a gripping support that eliminates many of the problems associated with pouring and drinking from such containers.

6 Claims, 9 Drawing Sheets

BOTTLE WITH GRIPPING SUPPORT

BACKGROUND OF THE INVENTION

The present invention relates to bottles particularly those commercially used for packaging beverages in one, two and three liter sizes.

Beverages including carbonated beverages are packaged and sold in 2 liter plastic bottles fabricated of a material known as PET and having very thin body walls. The bottle walls being so thin tend to deform or collapse when handled particularly when pouring from the container. The result is that it is cumbersome to handle such containers especially with one hand.

Because of the relative difficulty in handling these containers they are discarded or returned for deposit after a single use.

The present invention deals with this problem and provides a thin-walled plastic bottle that is easier to handle.

SUMMARY OF THE INVENTION

The present invention comprises a thin-walled plastics container preferably in 2 liter size which is provided with a gripping support that eliminates many of the problems associated with pouring and drinking from such containers. In particular, the gripping support enables the user to hold the bottle with one hand without fear of the bottle wall distorting or collapsing while pouring or drinking from the bottle, to have better control of bottle and contents when pouring, and to remove the bottle from a high or low grocery shelf without dropping the bottle.

The gripping support may be molded into the bottle wall during manufacture, or in modified embodiments of the invention, can be in the form of a strap affixed vertically to the bottle wall.

OBJECTS OF THE INVENTION

It is an object of the invention to provide a thin-wall plastic beverage container that is easier to handle.

It is an object of the invention to provide a thin-wall 2 liter beverage container with a gripping support to facilitate one hand manipulation of the container without collapsing the container wall, especially when pouring from the container.

It is an object of the invention to provide a thin-wall 2 liter beverage container with a molded-in gripping support to facilitate one hand manipulation of the container without collapsing the container wall, especially when pouring from the container.

It is an object of the invention to provide a thin-wall 2 liter beverage container with a strap gripping support to facilitate one hand manipulation of the container without collapsing the container wall, especially when pouring from the container.

Another object and advantage of the invention is to provide lightweight transparent plastic container that can be reused.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
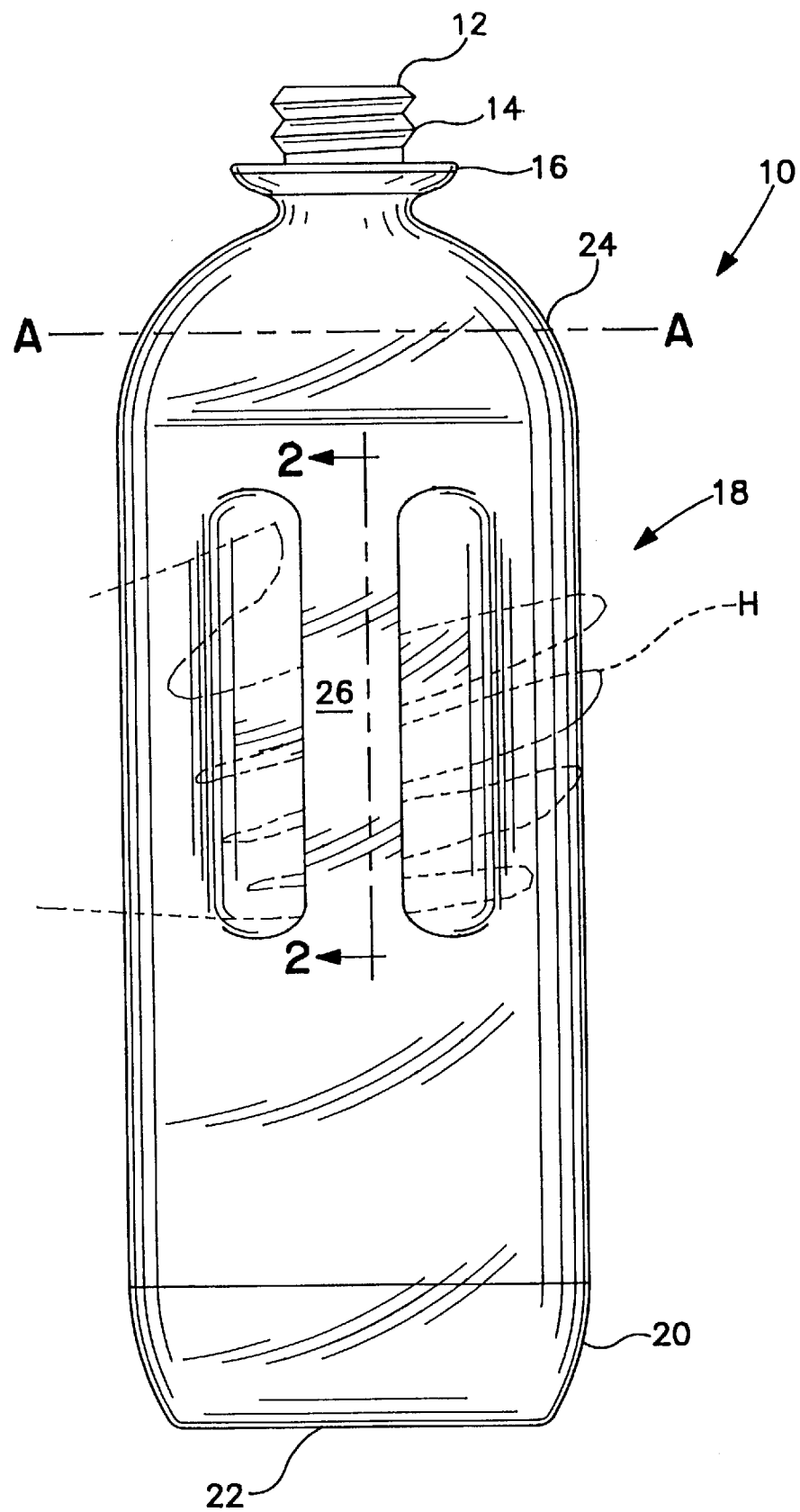
FIG. 1 is a front elevation view of a bottle showing a perferred embodiment of the invention.
Figures 2, 4:
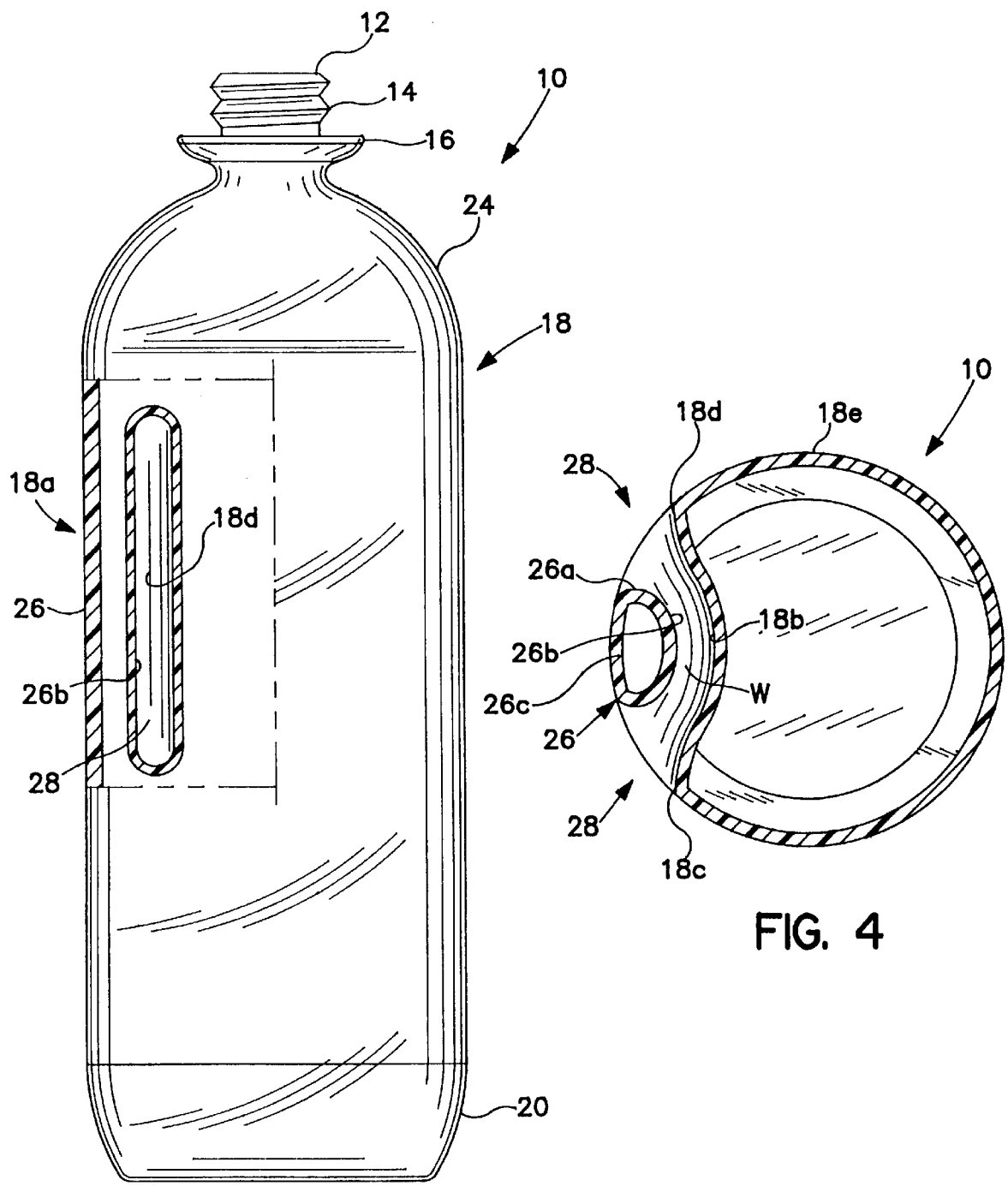
FIG. 2 is a section view taken along line 2—2 of FIG. 1.
FIG. 4 is a section view taken along line 4—4 of FIG. 3.
Figure 3:
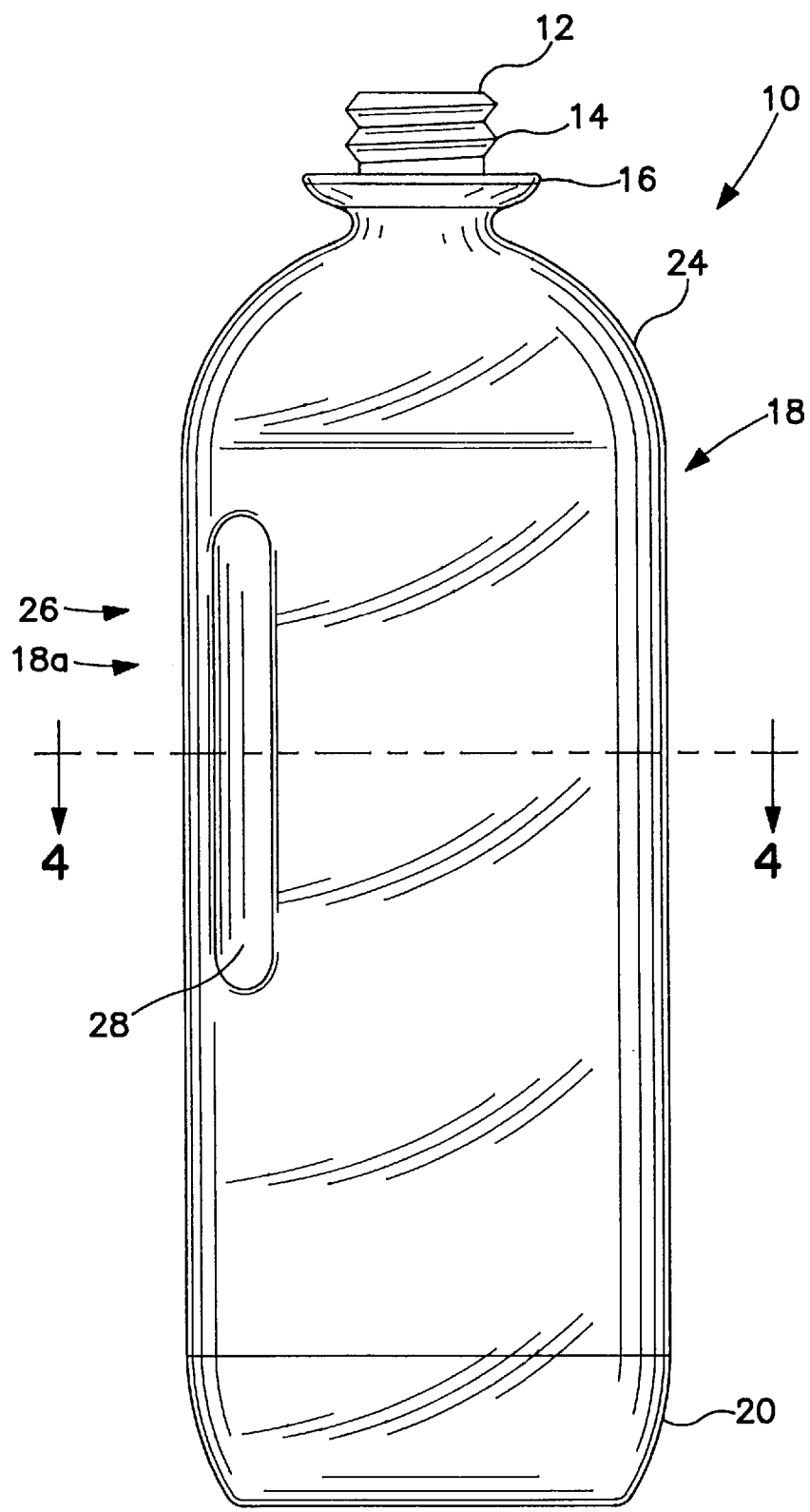
FIG. 3 is a side elevation view thereof.

Referring now to the drawing, FIGS. 1–4 illustrate a preferred embodiment of the invention comprising a bottle 10 fabricated of blow molded thin-wall plastic characterized by distortion or deformation of the bottle wall when held by one hand applying light pressure. Bottles of this kind are known as PET bottles and are commercially used for packaging carbonated soft drinks, for example.

The bottle has a top opening 12, a threaded neck 14 for receiving a closure cap (not shown), and a neck ring 16 for handling the bottle during manufacture. As shown, the main body portion 18 is generally cylindrical, has a tapered bottom wall portion 20, a base 22, and a tapered upper body portion 24 extending from the main body to the neck 14.

In accordance with a preferred embodiment of the invention, a gripping support 26 is molded into the cylindrical side wall of the bottle. The gripping support is defined by a closed portion 26*a* of side wall within the upper portion 18*a* of the main body and occupying up to two-thirds of the height of the cylindrical main body 18. A passage 28 is defined by the inner surface 26*b* of the gripping support and a concave section 18*b* of the bottle wall and passes from one side 18*c* of the bottle wall to the other 18*d*. The passage has sufficient width W to accommodate an adult hand firmly gripping the bottle. Preferably, the thickness 26*c* of the gripping support wall is substantially the same as the thickness 18*e* of the main bottle wall.

Figure 5:
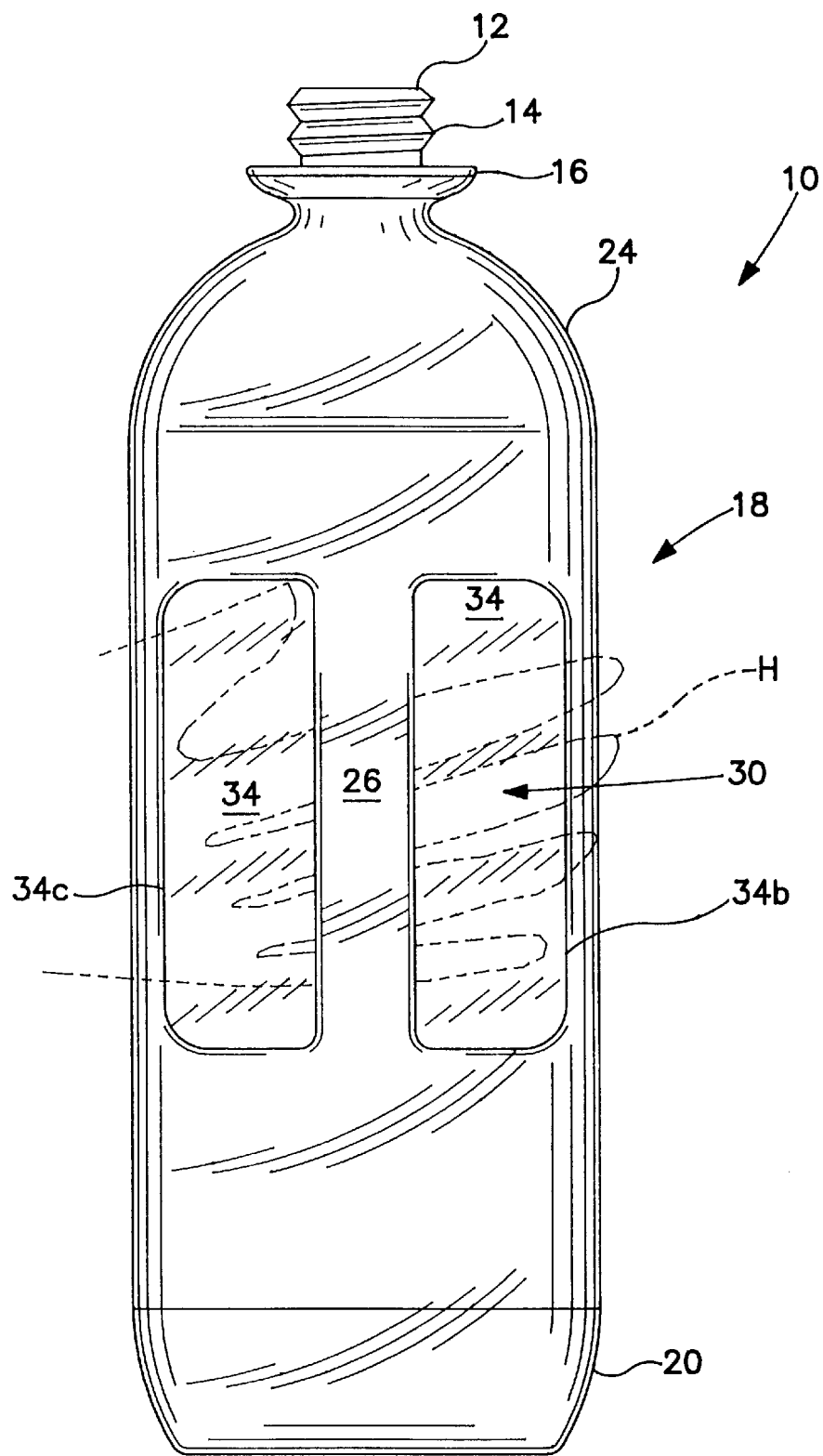
FIG. 5 is a front elevation view of a bottle showing a modified embodiment of the invention.
Figure 6:
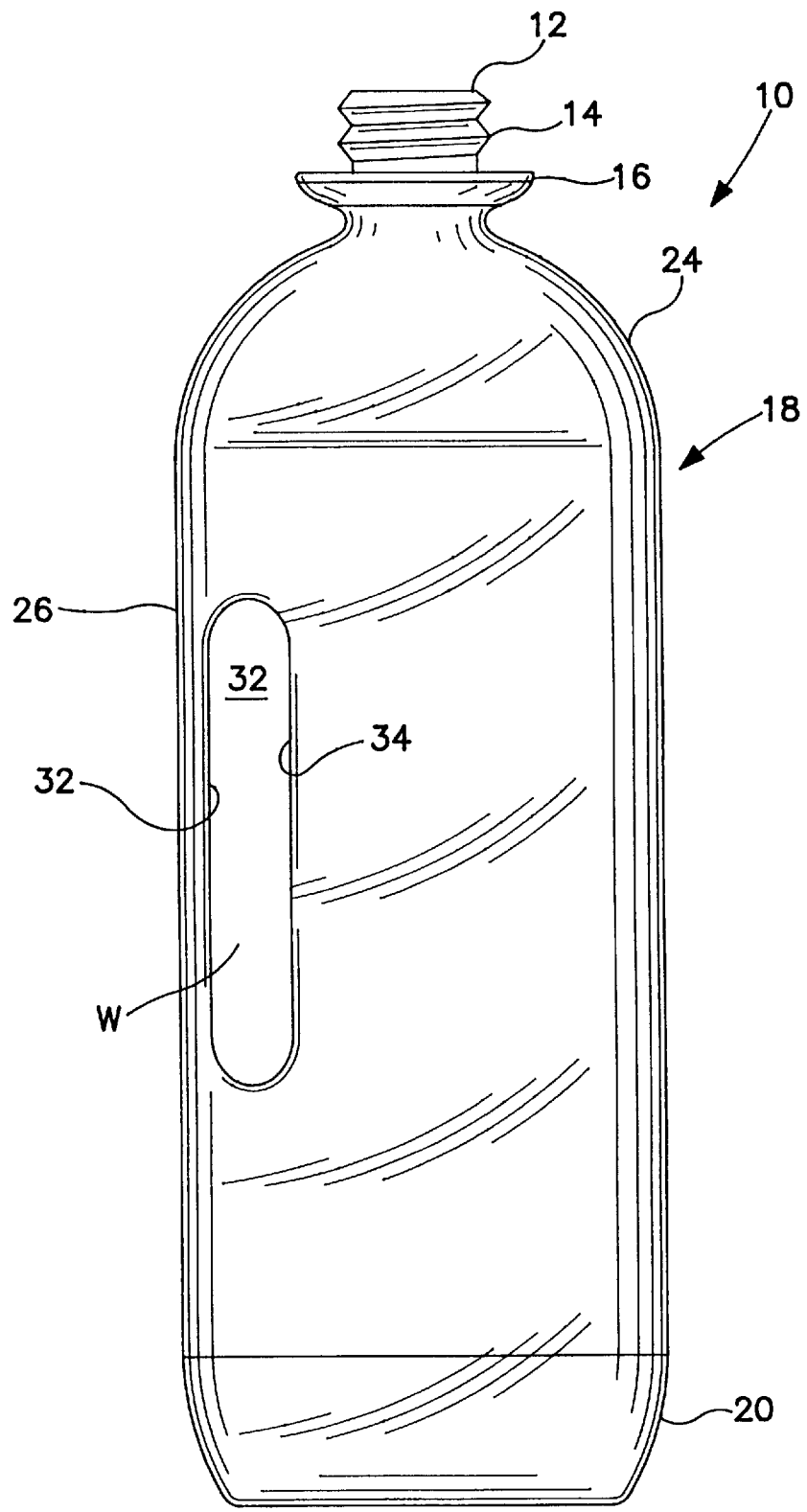
FIG. 6 is a side elevation view thereof.

FIGS. 5–6 illustrate a modified embodiment of the invention comprising a bottle of the same construction of the embodiment of FIGS. 1–4 to the extent indicated by use of common reference numbers. In this embodiment, a passage 30 is defined by the inner surface 32 of the gripping support and a generally planar section 34 of the bottle wall and passes from one side 34*b* of the bottle wall to the other 34*c*. The passage has sufficient width W to accommodate an adult hand firmly gripping the bottle.

Figure 7:
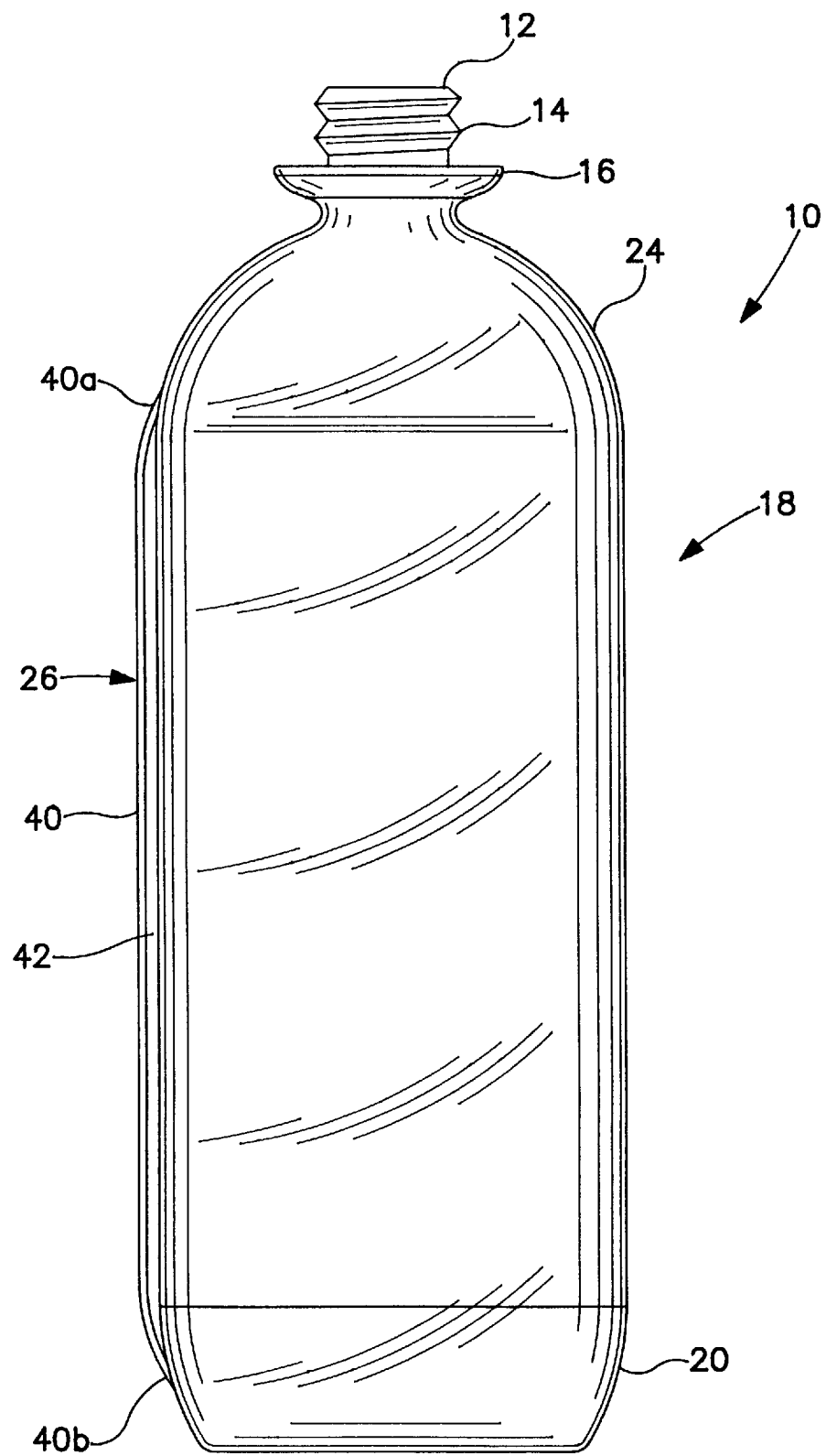
FIG. 7 is a front elevation view of a bottle showing another modified embodiment of the invention.
Figure 8:
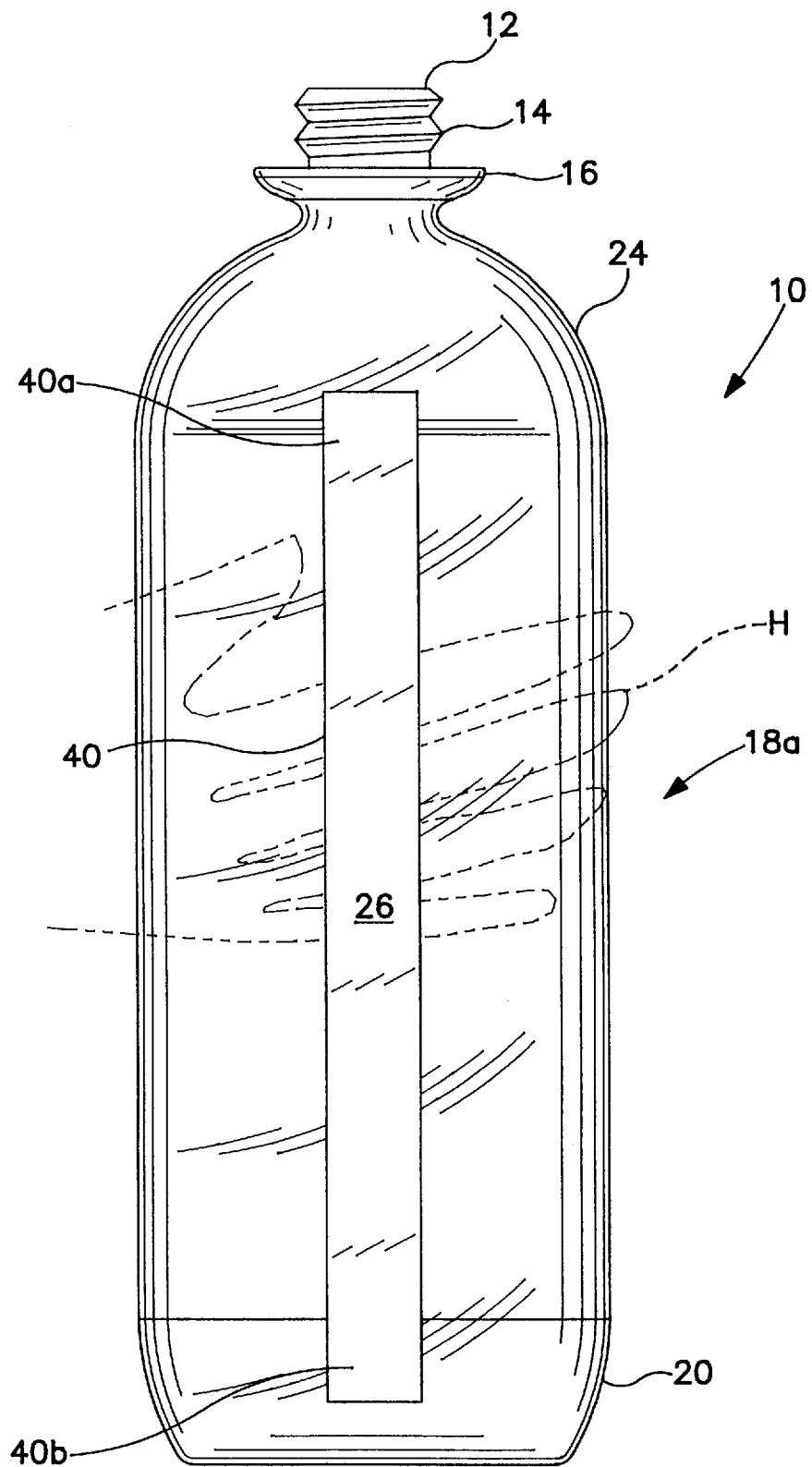
FIG. 8 is a side elevation view thereof.

FIGS. 7–8 illustrate a modified embodiment of the invention comprising a bottle 18*a* of the same construction of the embodiment of FIGS. 1–4 to the extent indicated by use of common reference numbers. In this embodiment, an elongate strap 40 preferably of the same material as the bottle is affixed at upper 40*a* and lower 40*b* points to the bottle wall. The strap 40 is preferrably in the form of a rectangular strip essentially lying along the vertical portion of the bottle wall with little or no space 42 between the strap and bottle wall. The strap serves as a gripping support by taking advantage of the pliant character of the bottle wall which allows the user to insert a hand between the strap and the bottle wall.

The bottle wall yields to accommodate the user's hand. Because of the close fit of gripping support and wall the user need not apply finger pressure to the bottle wall in order to manipulate the bottle. The frictional engagement of palm to bottle wall and of strap to the back of the hand provides a stable grip of the bottle without the need to squeeze the side wall. The user then has much better control of larger size bottles, i.e., two and three liter sizes, when pouring out the contents.

Figure 9:
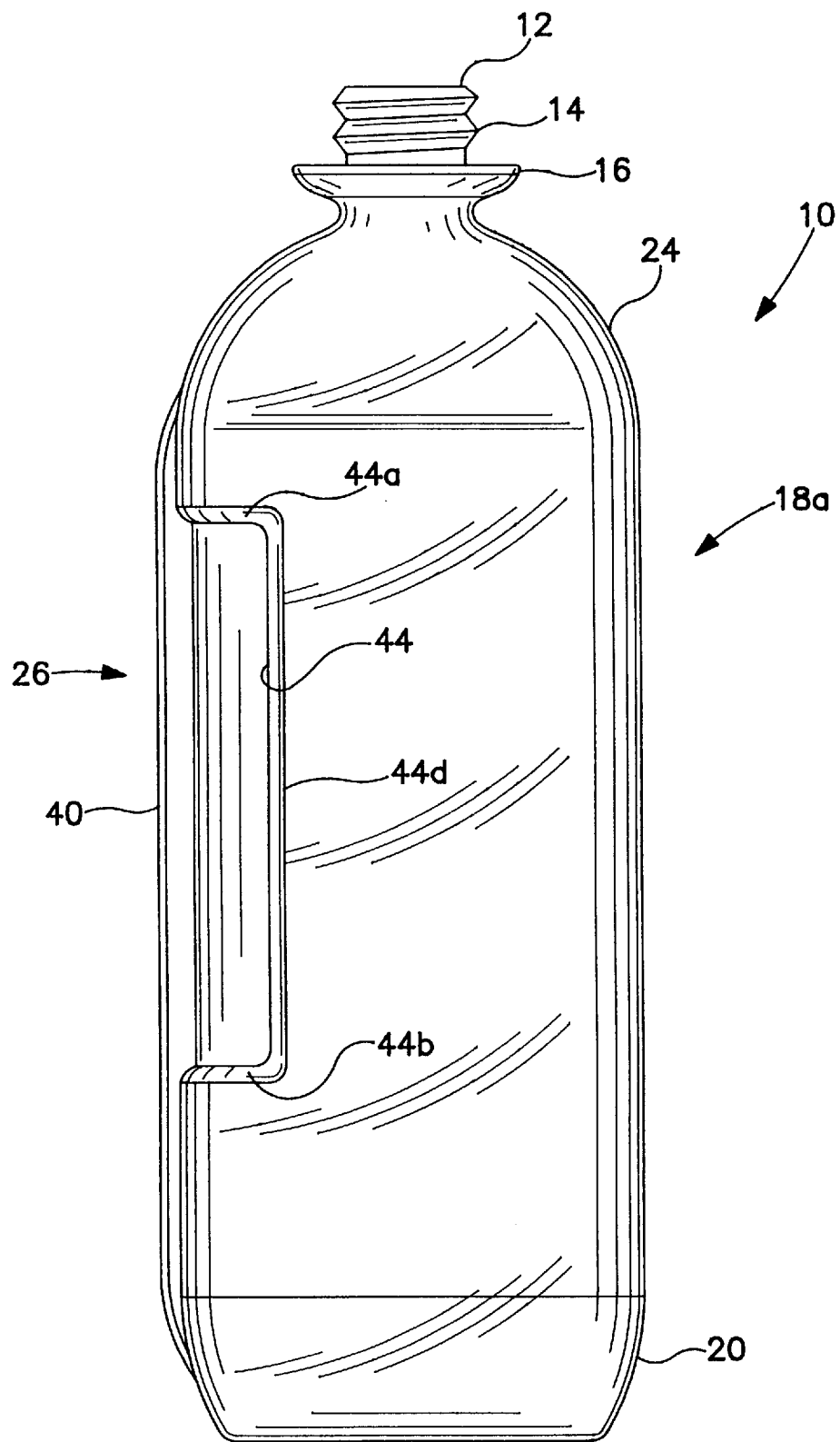
FIG. 9 is a front elevation view of a bottle showing another modified embodiment of the invention.
Figure 10:
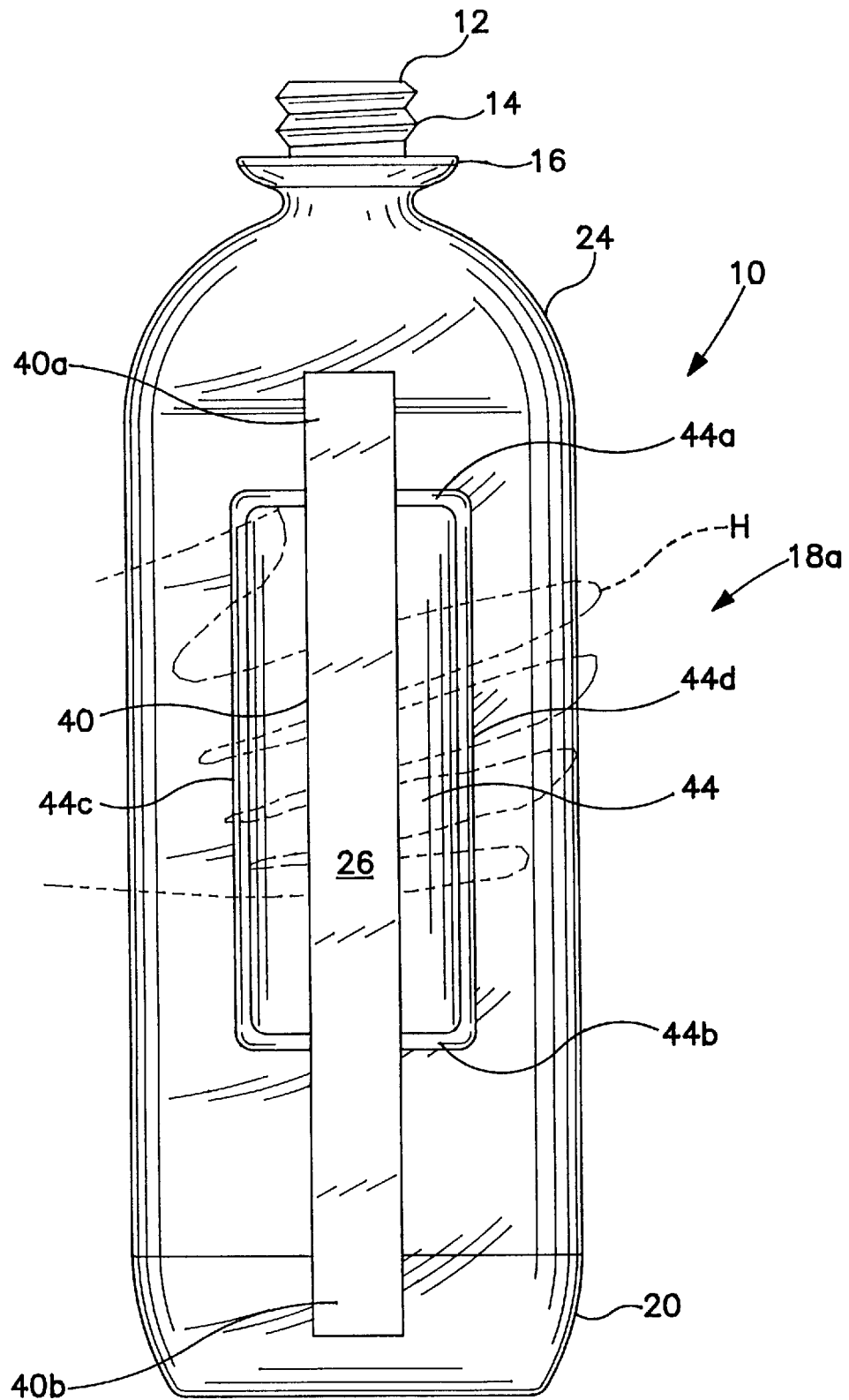
FIG. 10 is a side elevation view thereof.

FIGS. 9–10 illustrate a modified embodiment of the invention comprising a bottle 18a of the same construction of the embodiment of FIGS. 7–8 to the extent indicated by use of common reference numbers. In this embodiment, the bottle wall includes a molded-in recess 44 under the strap gripping support 40. The recess is defined by upper 44a, lower 44b, left 44c, and right 44d margins for accommodating the user's hand in gripping the bottle.

In current practice, bottles are filled approximately to the line A—A shown in FIG. 1 leaving additional bottle capacity that can be used to accommodate potential loss of bottle volume by reason of the molded-in gripping support of FIGS. 1–6, and the molded-in recess of FIGS. 9–10.

It is to be understood that a user inserts a hand into the passages 28 and 30 of the embodiments of FIGS. 1–4, and FIGS. 5–6, respectively, into the space 42 of FIGS. 7–8, and the molded recess of FIGS. 9–10. In each case the palm of the hand engages the bottle wall and the inner surface 26b of the gripping support 26 (FIGS. 1–4), the inner surface of the gripping support 32 (FIGS. 5–6), and the inner surface of the straps 40 (FIGS. 7–8, and FIGS. 9–10) engages or bears against the back of the hand to provide a stable grip of the bottle without the need to squeeze the side wall.

A thin wall plastic bottle having a molded or strap gripping support in accordance with the invention allows for ease of handling with one during removal from a grocery shelf and when pouring from the bottle without having the side wall of the bottle distorting, deforming, or collapsing with application of normal hand pressure.

I claim:

1. A beverage bottle formed of light weight, blow molded plastic, the bottle having a thin generally cylindrical main body wall (18), a tapered bottom wall portion (20), a base (22), a tapered upper body portion (24) and a neck (14) for receiving a closure cap all integrated into a unitary bottle, the main body wall normally deforming upon application of hand pressure normal for gripping the cylindrical main body wall when pouring out the contents of the bottle, a gripping support (26) molded into the cylindrical wall, the gripping support defined by a closed portion (26a) of the main body wall occupying up to two-thirds of the height of the main body wall, the gripping support having an inner surface, a passage (28) molded into the cylindrical wall and defined by the inner surface (26b) of the gripping support and a concave section (18b) of the bottle wall, the concave section (18b) of the bottle wall passing from one side (18c) of the bottle wall to the other 18d, the passage extending from said one side (18c) of the bottle to said other (18d), the passage being of sufficient width to accommodate an adult hand, the bottle with gripping support and passage being of integral construction, whereby the bottle is held without deformation for pouring out its contents by inserting a hand through the passage with fingers gripping the main body wall and the inner surface of the gripping support bearing against the back of the hand.

2. A beverage bottle according to claim 1 having a capacity of approximately 2 liters.

3. A beverage bottle formed of light weight, blow molded plastic, the bottle having a thin generally cylindrical main body wall (18), a tapered bottom wall portion (20), a base (22), a tapered upper body portion (24) and a neck (14) for receiving a closure cap all integrated into a unitary bottle, the main body wall normally deforming upon application of hand pressure normal for gripping the cylindrical main body wall when pouring out the contents of the bottle, a gripping support (26) molded into the cylindrical wall, the gripping support defined by a closed portion of the main body wall occupying up to two-thirds of the height of the main body wall, the gripping support having an inner surface, a passage (30) molded into the cylindrical wall and defined by the inner surface (32) of the gripping support and a generally planar section (34) of the bottle wall, the generally planar section (34) of the bottle wall passing from one side (34b) of the bottle wall to the other (34c), the passage extending from one side (34b) of the bottle to the other (34c), the passage being of sufficient width to accommodate an adult hand, the bottle with gripping support and passage being of integral construction, whereby the bottle is held without deformation for pouring out its contents by inserting a hand through the passage with fingers gripping the main body wall and the inner surface of the gripping support bearing against the back of the hand.

4. A beverage bottle according to claim 3 having a capacity of approximately 2 liters.

5. A beverage bottle formed of light weight, blow molded plastic, the bottle having a thin generally cylindrical main body wall (18), a tapered bottom wall portion (20), a base (22), a tapered upper body portion (24) and a neck (14) for receiving a closure cap all integrated into a unitary bottle, the main body wall normally deforming upon application of hand pressure normal for gripping the cylindrical main body wall when pouring out the contents of the bottle, an elongate gripping support strap (40) affixed at one end (40a) to the bottle upper body portion and at its other end (40b) to the bottom wall portion, the strap having an inner surface, a recess (44) molded into the cylindrical wall under the elongate strap and the recess being defined by upper (44a), lower (44b), left (44c), and right (44d) margins for accommodating a user's hand, whereby the bottle is held without deformation for pouring out its contents by inserting a hand between the recess and the strap with fingers gripping the main body wall and the inner surface of the gripping support strap bearing against the back of the hand.

6. A beverage bottle according to claim 5 having a capacity of approximately 2 liters.

* * * * *